United States Patent Office 2,719,861
Patented Oct. 4, 1955

2,719,861

2-AMINO-1,3,3-TRICYANO-2-PROPENE AND PREPARATION OF SAME

Rudolph Anthony Carboni, Wilmington, Del., assignor to E. I. du Pont de Nemours and Company, Wilmington, Del., a corporation of Delaware No Drawing. Application July 13, 1954,
Serial No. 443,141

5 Claims. (Cl. 260—465.5)

This invention relates to a new chemical compound and the preparation of same.

A variety of nitriles have been condensed to dimers and trimers by means of alkaline materials. For example, aliphatic mononitriles, such as acetonitrile, have been dimerized to 3-iminomononitriles by means of sodium in inert diluents followed by treatment of the resulting sodium derivative with water (J. Am. Chem. Soc. 64, 152 (1942)). Cyclic trimers of acetonitrile, propionitrile, and malononitrile have been formed by treatment of the monomeric nitrile with sodium alcoholates and other basic materials (Ann. 462, 273 (1928) and J. prakt. Chem. (2), 42, 1 (1890)). However, none of the acyclic compounds prepared in these ways contains the desirable combination of an ethylenic linkage, an active methylene group, an amino group, and a plurality of nitrile groups. Such an acyclic compound having these particular functional groups is especially desirable for use as an intermediate for the synthesis of a wide variety of novel compounds having unusual properties.

An object of the present invention is to provide a new chemical compound containing the combination of an ethylenic linkage, an active methylene group, an amino group, and a plurality of nitrile groups. A further object is to provide a process of preparing such compound. A more general object is to provide a novel chemical compound for use as an intermediate for the synthesis of novel compounds having unusual properties. Other objects will be apparent from the description of the invention given hereinafter.

The above objects are accomplished according to the present invention by condensing two moles of an alkali metal derivative of malononitrile at elevated temperature in an inert organic liquid free of active hydrogens and then hydrolyzing the resulting alkali metal derivative of the dimer with a strong mineral acid at a low temperature to form 2-amino-1,3,3-tricyano-2-propene.

The compound 2-amino-1,3,3-tricyano-2-propene has not been recognized in the prior art insofar as is known. It has the formula:

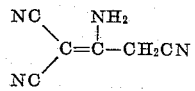

This compound in purified crystalline form is white and has a melting point of about 172° C.

An article by Richard Meier, Ber. 86, 1491 (1953) describes a process of preparing what is stated to be probably ethanetetracarbonitrile which may be alternately termed tetracyanoethane, by dropwise adding malonodinitrile to a solution of sodium in absolute alcohol and introducing nitrous oxide into the reaction mixture for three hours while the mixture is cooled in an ice-salt bath. Subsequent to his synthesis of 2-amino-1,3,3-tricyano-2-propene according to the present invention, applicant repeated this process of Meier's to assess its practical value as a method of synthesizing ethanetetracarbonitrile. He had no thought of synthesizing 2-amino-1,3,3-tricyano-2-propene by this Meier process. He isolated two products neither of which was ethanetetracarbonitrile. One of the products proved to be ethyl cyanoacetate and the other was a white crystalline solid having a melting point of 170–172° C. which appeared to be 2-amino-1,3,3-tricyano-2-propene. It showed no depression of melting point when mixed with a sample of 2-amino-1,3,3-tricyano-2-propene prepared according to the present invention and the infrared absorption spectra and X-ray diffraction patterns of the two substances also agreed.

It is apparent that Meier had no conception of the compound, 2-amino-1,3,3-tricyano-2-propene, and it is not known whether he unwittingly did prepare it and failed to appreciate the fact or whether he accidentally described his process so broadly as to encompass the procedure followed by applicant in attempting to prepare ethanetetracarbonitrile but whereby applicant actually prepared ethyl cyanoacetate and what appears to have been 2-amino-1,3,3-tricyano-2-propene. Applicant has been unable to prepare ethanetetracarbonitrile according to the procedure described by Meier. In any event, Meier does not disclose 2-amino-1,3,3-tricyano-2-propene nor the herein claimed process of preparing it.

A preferred way of making 2-amino-1,3,3-tricyano-2-propene according to this invention comprises suspending an alkali metal derivative of malononitrile, e. g., sodiomalononitrile, in an inert liquid diluent, e. g., a hydrocarbon such as benzene or an ether such as diethyl ether. The suspension is then agitated and heated to promote the condensation of the alkali metal derivative of malononitrile to the dimer. The reaction proceeds slowly at low temperatures, e. g., 35–40° C., but more rapid reaction is obtained with higher temperatures, e. g., temperatures up to 150–175° C. The upper limit on the reaction temperature is not critical but temperatures high enough to cause decomposition of the reactants or products should not be used. It is convenient to carry out the condensation in a diluent heated to reflux temperature. In this case the diluent selected should have a boiling point sufficiently high to produce a satisfactory reaction rate.

Since the rate of dimerization of the alkali metal derivative of malononitrile is not very rapid, substantial reaction times are required to obtain satisfactory yields of the product. In general, the reaction time is dependent on the reaction temperature being employed, longer times being required at lower temperatures. When the reaction is carried out in refluxing benzene (about 80° C.), appreciable yields of the desired dimer are obtained in 10 hours but better yields are obtained after a total reaction time of 24 hours. On the other hand, several days are required at temperatures as low as 35° C.

After the heating is completed, the alkali metal derivative of the dimer, which is insoluble in the reaction medium, is isolated by filtration and then dried. The resulting dimer is dissolved in cold water, i. e., water at a temperature below room temperature and, preferably, between 0° C. and 20° C., and to this solution there is added an amount of a strong mineral acid, e. g., hydrochloric acid, sufficient to remove the alkali metal from the derivative, whereupon the crude 2-amino-1,3,3-tricyano-2-propene precipitates from the solution. The crude precipitate is filtered from the mother liquor, washed with cold water, and then recrystallized from hot water.

The alkali metal derivative of malononitrile used in the process of this invention can be prepared by known methods, for example, by the method for making sodiomalononitrile described by Arndt, Schoetz, and Frobel, Ann. 521, 119 (1936). In this method a methyl alcoholic solution of sodium methylate is added to a methyl alcoholic solution of malononitrile. The resulting sodiomalononitrile is precipitated from the reaction solution by the addition of diethyl ether. After washing with ether and drying, the sodiomalononitrile is ready for use in the process of this invention.

Although better yields of 2-amino-1,3,3-tricyano-2-propene are obtained when the preformed alkali metal derivative of malononitrile is employed as the starting material, it is not essential that this be done. The alkali metal derivative of malononitrile can be prepared in situ if desired. In this embodiment of the invention, the alkali metal, e. g., sodium shavings, can be added to the solution of malononitrile, and the resulting mixture agitated and heated until dimerization takes place. At least one atom of alkali metal per mole of malononitrile is employed and, preferably, an excess of the alkali metal, e. g., 150% to 200%, is used since better yields are obtained. During the reaction the alkali metal derivative of the dimer precipitates from the reaction medium. At the end of the reaction, excess alkali metal is removed mechanically and the alkali metal derivative of 2-amino-1,3,3-tricyano-2-propene is dissolved in cold water. This aqueous solution is then treated with a strong mineral acid and the resulting 2-amino-1,3,3-tricyano-2-propene is isolated as described above.

The invention is further illustrated by the following examples in which the proportions of ingredients are expressed in parts by weight unless otherwise specified.

*Example I*

Sodiomalononitrile, 11.0 parts, is suspended in 132 parts of dry benzene and the mixture is refluxed for 24 hours with constant agitation. The mixture is then filtered, and the solid is dried at room temperature. The resulting solid is dissolved in 150 parts of ice cold water, and the solution is slowly treated with 8.3 parts of concentrated hydrochloric acid (d.=1.19) whereupon a tan crystalline solid separates. The solid reaction product is isolated by filtration under reduced pressure, washed with water, and dried at room temperature. Recrystallization from hot water yields 5.4 parts, corresponding to a yield of 65%, of well-defined needles of 2-amino-1,3,3-tricyano-2-propene, M. P. 170–173° C.

*Anal.*—Calcd. for $C_6H_4N_4$: C, 54.54%; H, 3.05%; N, 42.40%; Mol. Wt., 132. Found: C, 55.17%; H, 2.98%; N, 42.45%; Mol. Wt., 126, 142.07.

The infrared absorption spectrum of this product exhibits a pair of bands at 2.98 and 3.1 microns which are attributed to the $NH_2$ bonds. Two strong bands which appear at 6.01 and 6.43 microns are associated with the —C=C— and $NH_2$ functions, though these are closely coupled. Three bands appearing at 4.42, 4.51, and 4.55 microns are assigned to the nitrile groups.

*Example II*

To a solution of 6 parts of malononitrile in 89 parts of absolute diethyl ether is added 3.8 parts of metallic sodium shavings. The mixture is stirred at room temperature for one day and at reflux temperature (about 35° C.) for two additional days. The pieces of unreacted sodium are removed mechanically, and the remaining tan solid is collected by filtration. This solid is dissolved in 75 parts of ice cold water and is then treated with 5 parts of concentrated hydrochloric acid whereupon a brown solid separates. The solid is collected by filtration, washed with cold water, and recrystallized from hot water. There is obtained 0.7 part, corresponding to a yield of 12%, of 2-amino-1,3,3-tricyano-2-propene, M. P. 171–173° C. The melting point of this product shows no depression on admixture with a sample of the product of Example I.

It will be understood that the above examples are merely illustrative and that the present invention broadly comprises the new compound, 2-amino-1,3,3-tricyano-2-propene, and the process of preparing this compound by suspending a preformed alkali metal derivative of malononitrile in an inert organic liquid free of active hydrogens at a temperature of at least about 35° C. for a period of at least 10 hours, removing the solid matter from the suspension, dissolving the solid matter in water below room temperature, and adding sufficient strong mineral acid to the resulting solution to react with the alkali metal therein and thereby precipitate the 2-amino-1,3,3-tricyano-2-propene.

Alternatively, the invention comprises the process of preparing 2-amino-1,3,3-tricyano-2-propene by adding metallic sodium to a solution of malononitrile in an inert organic liquid free of active hydrogens in the proportion of at least one atom of sodium per mole of malononitrile, agitating the mixture at a temperature of at least 35° C. for a period of at least 24 hours, removing the unreacted sodium from the mixture, separating the remaining solid matter from the mixture, dissolving the solid matter in cold water, and then adding sufficient strong mineral acid to react with the combined sodium therein and thereby precipitate the 2-amino-1,3,3-tricyano-2-propene formed.

The instant process is generic to the use of any alkali metal derivative of malononitrile although generally the sodium derivative is most practical to use. The lithium and potassium derivatives can be used satisfactorily.

An essential factor in the preferred process of this invention is the use of an inert organic liquid. The organic liquid should be free of active hydrogens, i. e., free of any hydrogens that would react with the alkali metal derivative of malononitrile under the conditions of this process. Suitable inert organic liquids other than those disclosed in the examples include hydrocarbons such as octane and kerosene and ethers such as dibutyl ether, dioxane, and tetrahydrofuran.

The process in all cases should be carried out at a temperature of at least about 35° C. and it is preferred to use a temperature above about 80° C. Since it is convenient to heat the suspension to reflux, the selection of an inert organic liquid boiling at at least about 80° C., e. g., benzene, is preferred. Pressure is not critical and the process ordinarily will be carried out at atmospheric pressure as a matter of convenience.

The hydrolysis of the alkali metal derivative of the malononitrile dimer involves no special problems and can be carried out with any strong mineral acid such as hydrochloric, sulfuric, or phosphoric acids. Sufficient acid is added to react with the alkali metal in the aqueous solution of alkali metal derivative of the dimer with the result that the 2-amino-1,3,3-tricyano-2-propene is precipitated. If the crude 2-amino-1,3,3-tricyano-2-propene is dissolved in water, a decolorizing carbon mixed with the solution, and the 2-amino-1,3,3-tricyano-2-propene recrystallized, it will be white in color. In the absence of the decolorizing carbon, it tends to be a pale yellow to tan.

2-amino1,3,3-tricyano-2-propene is especially useful as a chemical intermediate due to the peculiar combination of functional groups it contains. It can be condensed with a wide variety of carbonyl-containing compounds such as aldehydes to give more complex compounds containing an amino and three cyano groups, which are useful per se and also as intermediates for the preparation of still more complex compounds. The reaction of 2-amino-1,3,3-tricyano-2-propene with aldehydes is illustrated by the following equation:

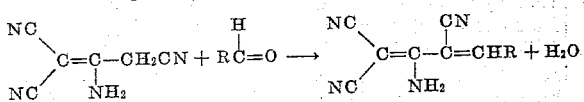

where R is alkyl or aryl.

By reacting 2-amino-1,3,3-tricyano-2-propene with p-dimethylaminobenzaldehyde, there is formed 1-(p-dimethylaminophenyl)-3-amino-2,4,4-tricyano-1,3-butadiene according to the following equation:

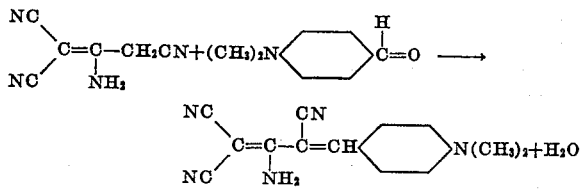

This is a new compound valuable as a yellow dye for cellulose acetate and polyester fibers. It melts at 265–268° C., has a maximum absorption, acetone max., of 434 millimicrons, and an extinction coefficient of 32,400.

2-amino-1,3,3-tricyano-2-propene is also useful as fungicide. One molecule of bromine combines with 2-amino-1,3,3-tricyano-2-propene when this compound is treated with bromine water. The resulting dibromo compound is useful as a fungicide and as an insecticide.

As many apparently widely different embodiments of this invention may be made without departing from the spirit and scope thereof, it is to be understood that the invention is not limited to the specific embodiments thereof except as defined in the appended claims.

The invention claimed is:

1. The compound, 2-amino-1,3,3-tricyano-2-propene.

2. Process of preparing 2-amino-1,3,3-tricyano-2-propene which comprises suspending an alkali metal derivative of malononitrile in an inert organic liquid free of active hydrogens at a temperature of at least about 35° C. for a period of at least 10 hours, removing the solid matter from said suspension, dissolving said solid matter in cold water, and adding sufficient strong mineral acid to said solution to react with the alkali metal therein and thereby precipitate the 2-amino-1,3,3-tricyano-2-propene.

3. Process of preparing 2 - amino - 1,3,3 - tricyano - 2 - propene which comprises suspending sodiomalononitrile in benzene, refluxing said suspension for a period of at least 24 hours, removing the solid matter from said suspension, dissolving said solid matter in water at 0° C. to 20° C., and adding sufficient strong mineral acid to said solution to react with the sodium therein and thereby precipitate the 2-amino-1,3,3-tricyano-2-propene.

4. Process of preparing 2-amino-1,3,3-tricyano-2-propene which comprises adding an alkali metal to a solution of malononitrile in an inert organic liquid free of active hydrogens in the proportion of at least one atom of alkali metal per mole of malononitrile, agitating the mixture at a temperature of at least 35° C. for a period of at least 10 hours, removing the untreated alkali metal from said mixture, separating the remaining solid matter from said mixture, dissolving said solid matter in water below room temperature, and adding sufficient strong mineral acid to react with the combined alkali metal therein and thereby precipitate the 2-amino-1,3,3-tricyano-2-propene formed.

5. Process of preparing 2-amino-1,3,3-tricyano-2-propene which comprises adding metallic sodium to a diethyl ether solution of malononitrile in the proportion of at least one atom of sodium per mole of malononitrile, agitating the mixture at a temperature of at least 35° C. for a period of at least 24 hours, removing the unreacted sodium from said mixture, separating the remaining solid matter from said mixture, dissolving said solid matter in cold water, and adding sufficient strong mineral acid to said solution to react with the combined sodium therein and thereby precipitate said 2-amino-1,3,3-tricyano-2-propene.

No references cited.